United States Patent
Kumar et al.

(10) Patent No.: US 11,675,687 B2
(45) Date of Patent: Jun. 13, 2023

(54) APPLICATION STATE PREDICTION USING COMPONENT STATE

(71) Applicant: BMC Software, Inc., Houston, TX (US)

(72) Inventors: Ajoy Kumar, Santa Clara, CA (US); Mantinder Jit Singh, Vancouver (CA); Smijith Pichappan, Bangalore (IN)

(73) Assignee: BMC Software, Inc., Houston, TX (US)

( * ) Notice: Subject to any disclaimer, the term of this patent is extended or adjusted under 35 U.S.C. 154(b) by 158 days.

(21) Appl. No.: 16/948,075

(22) Filed: Sep. 1, 2020

(65) Prior Publication Data

US 2022/0066906 A1 Mar. 3, 2022

(51) Int. Cl.

| | | |
|---|---|---|
| G06F 11/34 | (2006.01) | |
| G06F 11/36 | (2006.01) | |
| G06F 11/30 | (2006.01) | |
| G06N 20/00 | (2019.01) | |
| G06N 5/04 | (2023.01) | |

(52) U.S. Cl.
CPC ........ G06F 11/3608 (2013.01); G06F 11/302 (2013.01); G06F 11/3419 (2013.01); G06F 11/3447 (2013.01); G06N 5/04 (2013.01); G06N 20/00 (2019.01)

(58) Field of Classification Search
CPC ............... G06F 11/302; G06F 11/3452; G06F 11/3447; G06F 11/07; G06F 11/3409; G06F 11/079; G06N 20/00
See application file for complete search history.

(56) References Cited

U.S. PATENT DOCUMENTS

| | | | |
|---|---|---|---|
| 10,459,827 B1* | 10/2019 | Aghdaie | G06N 20/00 |
| 2015/0205691 A1* | 7/2015 | Seto | G06F 11/3452 |
| | | | 702/182 |
| 2018/0165584 A1* | 6/2018 | Jha | G06F 11/00 |
| 2019/0155712 A1* | 5/2019 | Tiwari | G06N 3/0427 |
| 2019/0294524 A1* | 9/2019 | Gupta | G06F 11/364 |
| 2020/0371892 A1* | 11/2020 | Huang | G06F 11/3062 |
| 2020/0409780 A1* | 12/2020 | Balasubramanian | |
| | | | G06F 11/3065 |
| 2021/0058424 A1* | 2/2021 | Chang | G06N 3/088 |
| 2021/0349747 A1* | 11/2021 | Albasheir | G06F 11/302 |

* cited by examiner

*Primary Examiner* — Yolanda L Wilson

(74) *Attorney, Agent, or Firm* — Brake Hughes Bellermann LLP

(57) ABSTRACT

Described systems and techniques enable prediction of a state of an application at a future time, with high levels of accuracy and specificity. Accordingly, operators may be provided with sufficient warning to avert poor user experiences. Unsupervised machine learning techniques may be used to characterize current states of applications and underlying components in a standardized manner. The resulting data effectively provides labelled training data that may then be used by supervised machine learning algorithms to build state prediction models. Resulting state prediction models may then be deployed and used to predict an application state of an application at a specified future time.

14 Claims, 11 Drawing Sheets

| Timestamp | Monitoring Metric-1 | Monitoring Metric-2... | Service-mgmt-1 | Service-mgmt-2 | M1 state | M2 state | M6 state | App state |
|---|---|---|---|---|---|---|---|---|
| t0-2 | | | | | 18 | 40 | 20 | 22 |
| t0-1 | | | | | 90(RCA) | 40 | 30 | 44 |
| t0 | | | | | 90 | 45 | 33 | 60 |
| t1 | | | | | 50 | 75 | 55 | 74 |
| t2 | | | | | 80 | 90 | 95 | 92 |

FIG. 9

APPLICATION STATE PREDICTION USING COMPONENT STATE

TECHNICAL FIELD

This description relates to predicting an application state.

BACKGROUND

Many companies and other entities have extensive technology landscapes, which include numerous Information Technology (IT) assets, including hardware and software. For example, such a technology landscape may include many different individual components, such as mainframe computers, servers such as web servers and application servers, routers, storage disks, cloud platforms, networks, IoT systems and devices, containers, applications, databases, and various other hardware and software components.

Several such components may support the same service or application. For example, a video conferencing application may be provided and supported by multiple servers, which may be geographically dispersed. Such applications are often user-facing, e.g., used directly by individuals, such as customers, employees, or partners of an organization, or other users. For example, a user of the video conferencing application just referenced would not typically care whether one of the component servers supporting the video conference application malfunctioned, as long as that user's experience of a current video conference is not affected. The user only knows when something malfunctions and cares that she can use the application. Performance levels of an application or the underlying components may therefore be of utmost importance to the application provider, system administrator, or operator of the service.

Conventional techniques attempt to track performance levels of applications and underlying components within a technology landscape. Such techniques are typically reactive and seek to identify a problem as quickly as possible after the problem occurs, in order to pursue a corresponding resolution. While advantageous, such approaches often fail to prevent user experiences of malfunctions and may require excessively long periods of time to resolve.

Moreover, such conventional approaches are often computationally wasteful, because computations are typically made with respect to at least some components and performance metrics that are unlikely to affect a user's experience. In particular, such conventional approaches often provide false positive identifications of malfunctions, which reduce the application provider's, system administrator's, or operator of the service's ability to identify and respond to actual malfunctions. The ability to accurately predict at any time the application states of an application supported by the components on a technology landscape would result in a better experience not only for the provider, administrator, or operator, but also for users of the systems, devices, or applications supported thereon.

SUMMARY

According to one general aspect, a computer program product that is tangibly embodied on a non-transitory computer-readable storage medium may comprise instructions. When executed by at least one computing device, the instructions may be configured to cause the at least one computing device to receive a data stream of performance metrics characterizing a technology landscape, the technology landscape including at least one application provided by at least one component. The instructions, when executed, may be configured to cause the at least one computing device to detect a temporal pattern of component states of the at least one component, based on the performance metrics, and predict a future application state of the at least one application, based on the temporal pattern of component states.

According to another general aspect, a computer-implemented method may include receiving a data stream of performance metrics characterizing a technology landscape, the technology landscape including at least one application provided by at least one component. The computer-implemented method may include detecting a temporal pattern of component states of the at least one component, based on the performance metrics, and predicting a future application state of the at least one application, based on the temporal pattern of component states.

According to another general aspect, a system may include at least one memory including instructions, and at least one processor that is operably coupled to the at least one memory and that is arranged and configured to execute instructions stored using the at least one memory. When executed, the instructions may cause the at least one processor to receive a data stream of performance metrics characterizing a technology landscape, the technology landscape including at least one application provided by at least one component. The instructions, when executed, may be configured to cause the at least one processor to detect a temporal pattern of component states of the at least one component, based on the performance metrics, and predict a future application state of the at least one application, based on the temporal pattern of component states.

The details of one or more implementations are set forth in the accompanying drawings and the description below. Other features will be apparent from the description and drawings, and from the claims.

BRIEF DESCRIPTION OF THE DRAWINGS

FIG. 9 is an example chart illustrating calculated component and application states, and related temporal patterns.

DETAILED DESCRIPTION

Described systems and techniques enable prediction of a state of an application at a future time, with high levels of accuracy and specificity. Predicted application states may include multiple types of states of an application in addition to total lack of availability of an application (e.g., outages). For example, predicted application states may include specific levels of performance downgrades, such as specified levels of latency. Moreover, predicted application states may be predicted with respect to bounded time windows, such as predicting an application outage within 60-90 minutes. Accordingly, operators may be provided with sufficient warning to avert poor user experiences. Further, when multiple predictions are provided with respect to multiple applications, operators are provided with an ability to prioritize preventative efforts with respect to both a severity and a need for immediacy of correction for each predicted application state.

Described techniques utilize unsupervised machine learning techniques to detect previously unseen events without any prior knowledge about them and thereby characterize current states of applications and underlying components in a standardized manner. The resulting data effectively provides labelled training data that may then be used by supervised machine learning algorithms to build state prediction models. Resulting state prediction models may then be deployed and used to predict an application state of an application at a specified future time, based on patterns of detected and predicted component states of components of the application.

Figure 1:
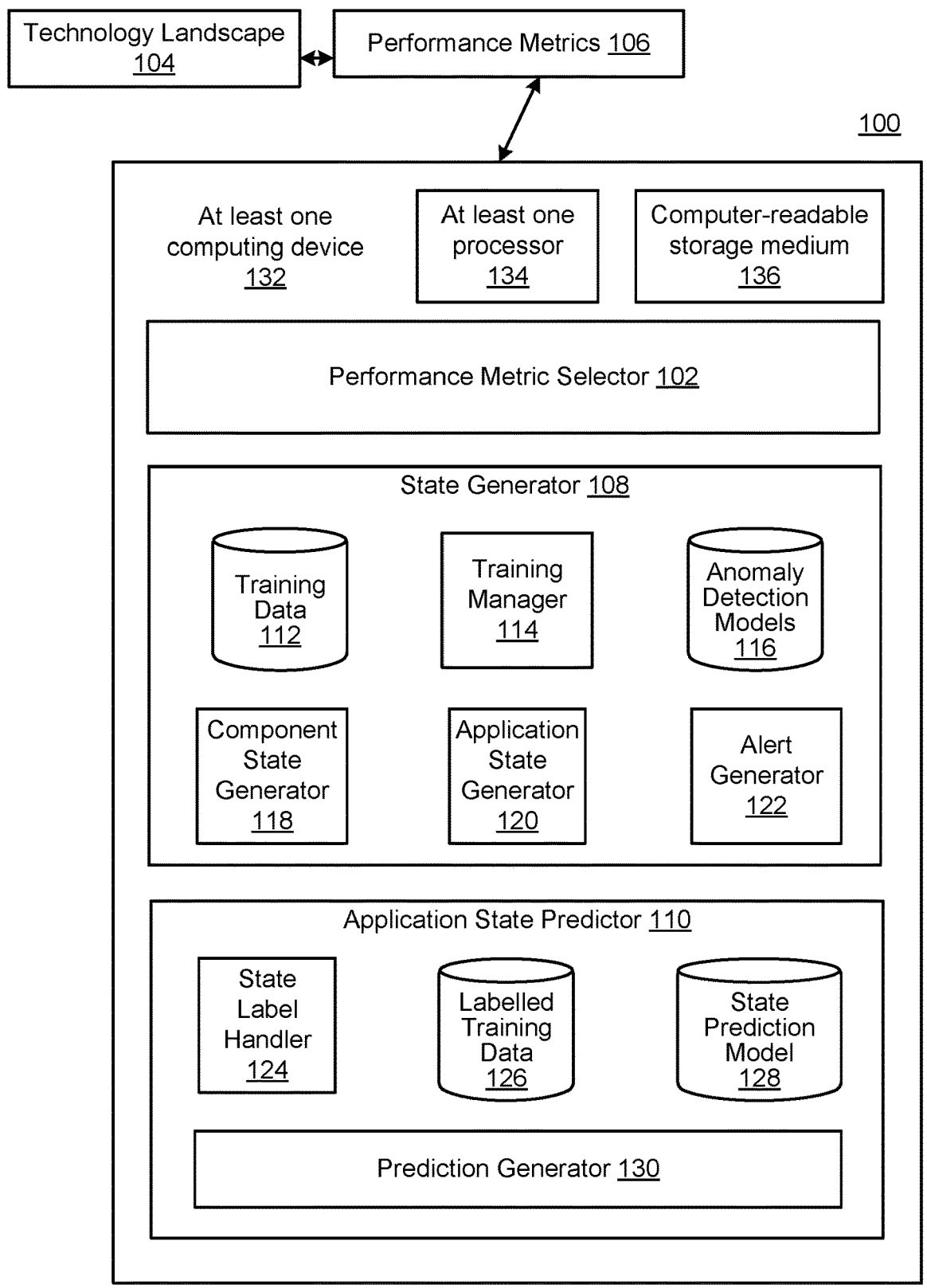
FIG. 1 is a block diagram of a system for application state prediction using component state.

FIG. 1 is a block diagram of a system 100 for application state prediction using component state. In FIG. 1, a performance metric selector 102 is configured, for a technology landscape 104, to select a plurality of selected performance metrics from a plurality of available performance metrics 106.

Then, a state generator 108 may be configured to determine current states of both an application and underlying components, and to generate alerts that are responsive to the determined states. In this way, a user of the system 100 may receive real-time or near real-time alerts regarding a current status of an application and/or component. In addition to generating such alerts and related actions, the state generator 108 may be configured to generate standardized, normalized states for an application and underlying components, which may be stored in conjunction with synchronously-occurring conditions (e.g., latencies, outages) that existed at the time the states were generated.

An application state predictor 110 may thus use the states and underlying conditions to provide labelled training data, which may itself be used to train one or more supervised machine learning models. Such models may be trained to recognize patterns of component states that lead to, and are predictive of, future application state(s). Thus, the resulting models may be used to monitor real-time data received within the performance metrics 106, and to predict, with high levels of specificity and accuracy, future application states. For example, the application state predictor 110 may be configured to predict that an application will experience a defined degree of latency within 60-90 minutes.

In FIG. 1, the technology landscape 104 may represent any combination of components that may be a suitable source of performance metrics 106 that may be processed for alerts and state predictions using the system 100. For example, in some embodiments, the technology landscape 104 may represent a network and related infrastructure that provides services, systems, and other applications to employees and customers.

For example, as referenced above, and in various examples below, the technology landscape 104 may provide a video conferencing application used by the employees and/or customers. Such applications may be provided by multiple components, such as web servers, application servers, databases, containers, networking elements such as routers, and various other hardware and software components. In many cases, such components may be geographically dispersed, and connected by one or more networks. In many cases, one component may support multiple instances of a single application, and/or may support multiple applications, as well.

The technology landscape 104 may represent or include various other types of infrastructures. For example, the technology landscape 104 may include a mainframe computing environment, or may also represent scenarios in which sensors are used to monitor environmental conditions and report on corresponding status information (e.g., with respect to patients in a healthcare setting, working conditions of manufacturing equipment or other types of machinery, and many other industrial settings).

Consequently, the performance metrics 106 may represent any corresponding type(s) of data that is captured and reported, particularly in an ongoing, dynamic fashion, and for a potentially large number of performance metrics. For example, in an industrial oil processing setting, the performance metrics 106 may characterize a condition of pieces of equipment such as compressors or motoers that are being monitored; in a banking setting, the performance metrics 106 may characterize the condition of an automated teller machine (ATM); and in a healthcare setting the performance metrics 106 may characterize either a condition of patients being monitored. The performance metrics 106 may characterize the condition of the sensors themselves that are being used to perform such monitoring.

In many of the examples below, the performance metrics 106 may include key performance indicators (KPIs). The term KPI should be understood broadly to represent or include any measurable value that can be used to indicate a present or future condition, or enable an inference of a present or future condition, with respect to a measured context (including, e.g., the example contexts referenced above). KPIs are often selected and defined with respect to an intended goal or objective, such as maintaining an operational status of a piece of equipment, a sensor, an application or a network, and/or the provision of a desired level of service to a user. For example, KPIs may include a percentage of central processing unit (CPU) resources in use at a given time, an amount of memory in use, availability, latency, throughput, error rates, synthetic transaction monitoring, and/or user monitoring. A given system may have hundreds or even thousands of KPIs that measure a wide range of performance aspects.

In some example implementations, the performance metrics 106 may represent or include a large repository of stored data. The system 100 may be instrumental in analyzing such data in a highly fast, efficient, customized, and reliable manner, as described herein.

In many implementations, however, the performance metrics 106 represent a real-time or near real-time data stream that is frequently or constantly being received with respect to the technology landscape 104. For example, as described in examples below, the performance metrics 106 may be considered to be received within defined time windows, such as in fractions of a second or every second, every minute, every five minutes, or every hour.

The performance metrics 106 may include other types of metrics characterizing aspects of the technology landscape 104. For example, the performance metrics 106 may include feedback (e.g., a rating) from employees or customers, as well as incident tickets processed by customer support personnel. Other examples of performance metrics are provided below, e.g., with respect to FIGS. 6-8.

In FIG. 1, the performance metrics 106 may represent hundreds or thousands of individual performance metrics (e.g., KPIs), characterizing an entirety of the technology landscape. The performance metric selector 102 is configured to select a subset of the performance metrics 106 that are determined to be most suitable for, and useful by, the state generator 108 and the application state predictor 110.

For example, a principle component analysis (PCA) may be implemented by the state generator 108 to reduce the set of performance metrics 106 to a selected set of performance metrics to be used by the state generator 108. For example, for a set of KPIs, the performance metric selector may perform a PCA analysis to determine KPIs that have the highest degree of variation, because such KPIs may be more correlated with, and indicative of, an failure-level anomaly in an application state or component state. In some implementations, as described below with respect to FIG. 6, a metric selection model 604 may be trained to use PCA to select such state-correlated performance metrics.

For the performance metrics selected by the performance metric selector 102, the state generator 108 may store corresponding values for the selected performance metrics as training data 112. A training manager 114 may use the resulting training data 112 to train anomaly detection models 116. As referenced above, and described in more detail, below, such anomaly detection models 116 may be used to provide actionable insights to enable reliable operations across the technology landscape 104. Such insights include, e.g., detection and characterizations of the nature, location, and timing of an anomaly, as well as a severity or trend of such an anomaly. Accordingly, with insights, anomalies may be avoided or resolved in a minimal time period, with minimal effect, and with minimal knowledge, training, and effort required of a system administrator.

A component state generator 118 and an application state generator 120 may be configured to determine, using outputs of the anomaly detection models 116, standardized, normalized state characterizations for individual components (e.g., servers, databases, devices, or other software or hardware components) and applications (e.g., services) within the technology landscape. For example, as in embodiments described below, the component state generator 118 and the application state generator 120 may generate a state score on a standardized scale, such as 0-100, where increasing scores indicate increasingly problematic states, and with a score of 100 indicating an outage.

For example, the anomaly detection models 116 may be constructed by the training manager 114 using unsupervised machine learning algorithms and associated techniques, examples of which are described below. An alert generator 122 may be configured to score the selected performance metrics identified by the performance metric selector 102 against the data stream of performance metrics 106, and thereby determine for example, anomalies and take associated actions (e.g., generate alerts).

For example, scores may be generated for defined KPIs or groups of KPIs, and then anomaly thresholds may be set with respect to those scores. When the corresponding, actual KPI values are compared to the anomaly thresholds, corresponding deviations may be identified and characterized. For example, anomaly thresholds may be set as green/yellow/red values, so that a KPI with values that deviate from (e.g., exceed) each such anomaly threshold may be visually displayed in a corresponding color by the alert generator 122.

The alert generator 122 may provide additional levels of analysis beyond the detection of individual score deviations, such as trend analysis, and alerts based on a set of rules or other criteria. Alerts may include simple alerts indicating a malfunction, alerts indicating potential future malfunctions based on rules and/or a trend analysis, or alerts identifying areas in which performance efficiency may be increased, or in which resources may be conserved.

In FIG. 1, the component state generator 118, application state generator 120, and the alert generator 122 are illustrated as separate components or modules. However, in various implementations, corresponding functions may be combined and implemented using a single component or module. For example, a combination of the component state generator 118, the application state generator 120, and the alert generator 122 may be configured to utilize, identify, or calculate (e.g., score) appropriate ones of the anomaly detection models 116, while outputting state scores for components and applications to the application state predictor 110, and also outputting real-time alerts to a user of the system 100. In some implementations, the state scores (e.g., on a scale of 0-100, as referenced herein) may be used to trigger alerts, such as whenever any state value exceeds a defined threshold.

The application state predictor 110, as referenced above, may then receive component states generated by the component state generator 118 and application states generated by the application state generator 120, e.g., at a state label handler 124, which may be configured to apply the received states as labels to corresponding data from training data 112. For example, a component outage detected at a particular time stamp may have a component state score value of 100 at such time stamp, so that the labelled training data includes the outage, the state score of 100, and the timestamp.

In this way, the labelled training data 126 may be automatically constructed to include a large quantity of historical performance metrics, labelled with corresponding state scores. A training manager 114 may then be configured to train one or more state prediction models 128, using supervised machine learning algorithms, as described in more detail, below, to enable a prediction generator 130 to provide the types of application state predictions referenced above.

In particular, the state prediction model(s) 128 may be trained to identify temporal patterns of connecting component states that occur over time and that precede states in an application supported by corresponding components. For example, for an application supported by components 1-6 of the technology landscape 104, the labelled training data 126 may include labelled data indicating a pattern in which for example, component 3 has a state score within a certain range at a first timestamp, and then for example, component 4 has a state score above a defined threshold at a second timestamp, and then for example, component 6 has an outage at a third timestamp, prior to an application outage at a fourth timestamp. Accordingly, the state prediction model 128 may be used by the prediction generator 130 to recognize a current pattern of example components 3, 4, and 6 experiencing corresponding states, and predict the outage of the application accordingly.

The above example, although highly simplified for the sake of explanation, illustrates that the system 100 of FIG. 1 may be understood to consider and define a timeline prior to an application point of failure or other application state, and work backwards "N" timesteps to find a root cause of a sequence of states, e.g., anomalies experienced by a plurality of components, and to identify the corresponding pattern of such anomalies. These patterns may thus be used by the training manager 114, together with the labelled training data 126, to train the state prediction model 128. When the state prediction model 128 is deployed to receive current, real-time data from the performance metrics 106, it becomes possible to predict a future component's state (e.g., anomaly, incident, degradation, or outage) with a high degree of specificity.

In FIG. 1, the performance metric selector 102, the state generator 108, and the application state predictor 110 are illustrated as being implemented using at least one computing device 132, including at least one processor 134 and a non-transitory computer-readable storage medium 136. That is, the non-transitory computer-readable storage medium 136 may store instructions that, when executed by the at least one processor 134, cause the at least one computing device 132 to provide the functionalities described herein.

For example, the at least one computing device 132 may represent a mainframe or one or more servers. For example, the at least one computing device 132 may be implemented as two or more servers in communication with one another over a network. Accordingly, the performance metric selector 102, the state generator 108, and the application state predictor 110, or portions thereof, may be implemented using separate devices, in communication with one another. In other implementations, however, although the performance metric selector 102, the state generator 108, and the application state predictor 110 are illustrated separately, it will be appreciated that some or all of the respective functionalities of the performance metric selector 102, the state generator 108, and the application state predictor 110 may be implemented partially or completely together.

Figure 2:
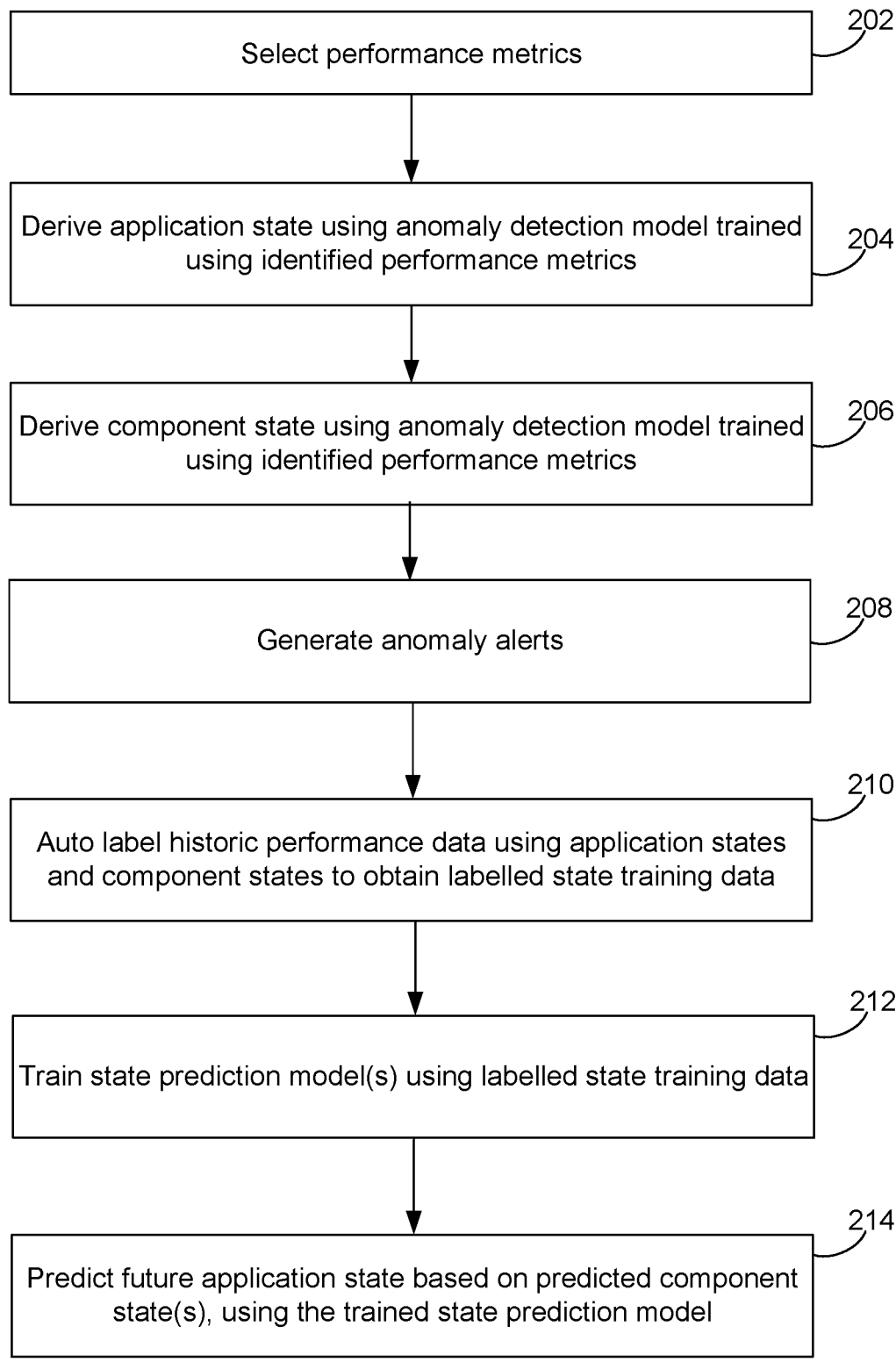
FIG. 2 is a flowchart illustrating example operations of the system of FIG. 1.

FIG. 2 is a flowchart illustrating example operations of the system of FIG. 1. In the example of FIG. 2, operations 202-214 are illustrated as separate, sequential operations. In various implementations, the operations 202-214 may include sub-operations, may be performed in a different order, may include alternative or additional operations, or may omit one or more operations. Further, in all such implementations, included operations may be performed in a parallel manner, or in an iterative, looped, nested, or branched fashion.

In the example of FIG. 2, performance metrics may be selected (202) from a data stream of performance metrics characterizing a technology landscape 104. For example, the performance metric selector 102 may analyze received performance metrics 106, including historical, stored performance metrics, to select a subset thereof considered to be most relevant and predictive. As referenced above, and described in more detail, below, the performance metric selector may use PCA to reduce available performance metrics to obtain selected performance metrics, and/or a machine learning model may be trained to identify specific performance metrics that are likely to be correlated with component or application states, e.g., abnormalities.

An application state may be derived using an anomaly detection model trained using identified performance metrics (204). For example, the component state generator 118 may be configured to score one or more anomaly detection models 116 against currently-received values of the selected performance metrics from the data stream of performance metrics 106. For example, each application, or type of application, of a plurality of applications in the technology landscape 104 may have a corresponding anomaly detection model that is trained using historical performance metric for that application, or type of application.

Similarly, component state(s) may be derived using an anomaly detection model trained using identified performance metrics (206). For example, the application state generator 120 may be configured to score one or more of the anomaly detection models 116 against currently received values of the selected performance metrics from the data stream of performance metrics 106. For example, each component, or type of component, of a plurality of components in the technology landscape (104) may have a corresponding anomaly detection model that is trained using historical performance metrics for that component, or type of component.

Anomaly alerts may be generated (208). For example, although shown sequentially in FIG. 2, the alert generator 122 may generate anomaly alerts in parallel with the determinations of component states by the component state generator 118 and of application states by the application state generator 120. In some implementations, the generated state values may be used to generate alerts. In other implementations, separate thresholds may be set for alert generations, while the state scores are standardized and normalized to a separate, common scale.

Historic performance data may be auto-labeled using application states and component states to obtain labelled state training data (210). For example, the state label handler 124 of FIG. 1 may be configured to receive state scores from the component state generator 118 and the application state generator 120, and assign the state scores to corresponding incidents and timestamps to create labelled training data 126.

State prediction model(s) may be trained, using the labelled state training data (212). For example, the training manager 114 may be configured to use the labelled training data 126 to train the state prediction models 128. In some implementations, described in detail, below, the training manager 114 may store, or have access to, additional data that may be used to execute the described training.

For example, within the technology landscape 104, an application or service may be associated with a corresponding service model, which may be represented as a directed, causal, and/or flat graph of components providing each application or service. Examples of service models and/or associated causal graphs are provided below, e.g., with respect to FIGS. 4, 5, 10, and 11. Such graphs may be used by the training manager 114 to define and identify temporal incident patterns in component state changes leading to application state changes.

Finally, FIG. 2 illustrates prediction of future application states based on predicted component state(s) using the trained state prediction model (214). For example, the prediction generator 130 may be configured to access the real time data stream of performance metrics 106, and provide predictions of an application's state within defined future time windows.

Figure 3:
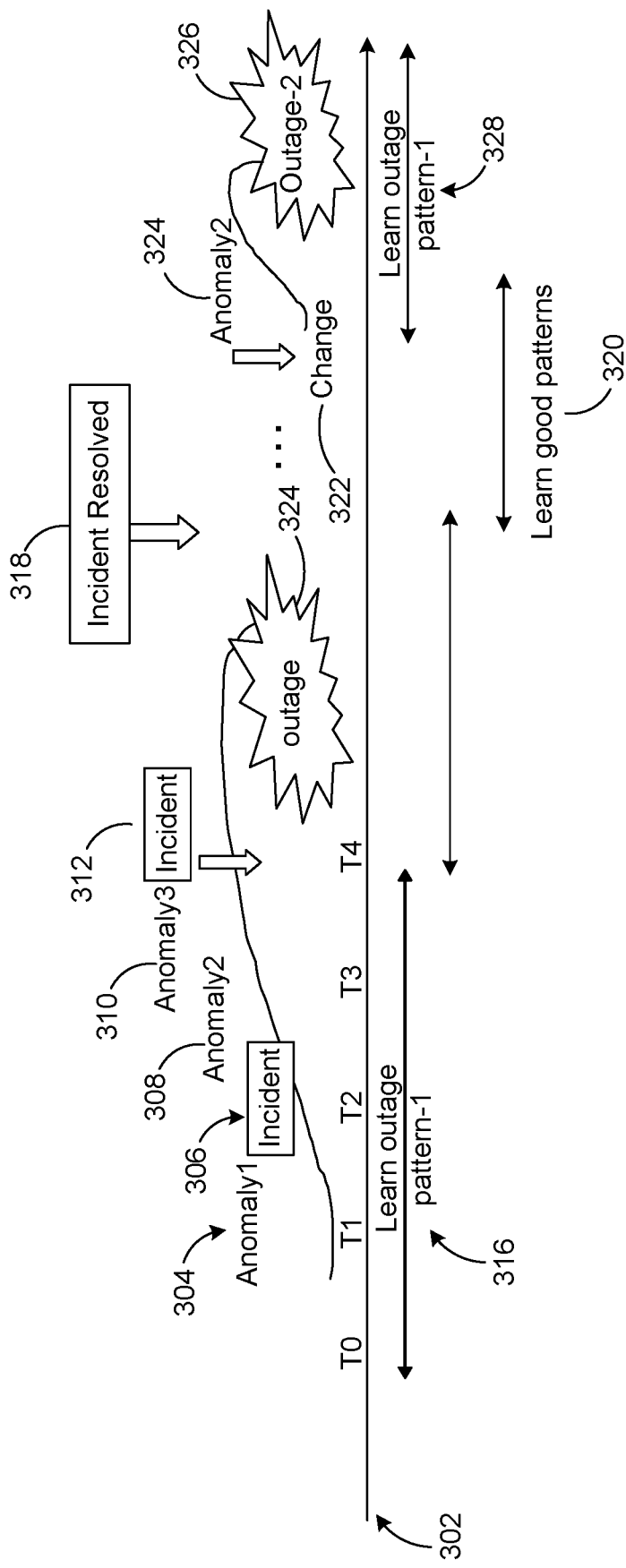
FIG. 3 is a timeline illustrating example temporal patterns that may occur within a technology landscape, and that may be used by the system of FIG. 1 to predict application states using component states.

FIG. 3 is a timeline 302 illustrating example temporal patterns that may occur within a technology landscape (104), and that may be used by the system of FIG. 1 to predict application states such as outages using component states of anomalies and corresponding incidents. In FIG. 3, a first anomaly 304 is detected at a time T1, and an incident 306 is reported at time T2. A second anomaly 308 and a third anomaly 310 occur at time T3, and a second incident 312 is reported at time T4. A first outage 314 then occurs at a time T5. This sequence of events may be determined to represent a first outage pattern 316.

Incident resolution 318 precedes a good pattern(s) with no anomalies, incidents, or outages, until a change 322 precipitates an anomaly 324, which is followed by a second outage 326. The pattern of change 322, anomaly 324, and outage 326 may thus define a second outage pattern 328.

Thus, FIG. 3 illustrates that the system 100 of FIG. 1 may learn both good and bad patterns that exist within the technology landscape (104), and that are predictive of outages and other undesired behaviors, as well as of desirable (e.g., incident-free and anomaly-free patterns). As described above, the patterns of FIG. 3 may be used as labelled training data 126, to enable the training manager 114 to execute supervised machine learning techniques to construct one or more state prediction model(s) 128. For example, at a current time and for currently-received performance metrics, a resulting state prediction model 128 may be able to recognize an anomaly corresponding to the anomaly 304, and an incident corresponding to the incident 306, as being predictive of an outage three timestamps in the future.

Figure 4:
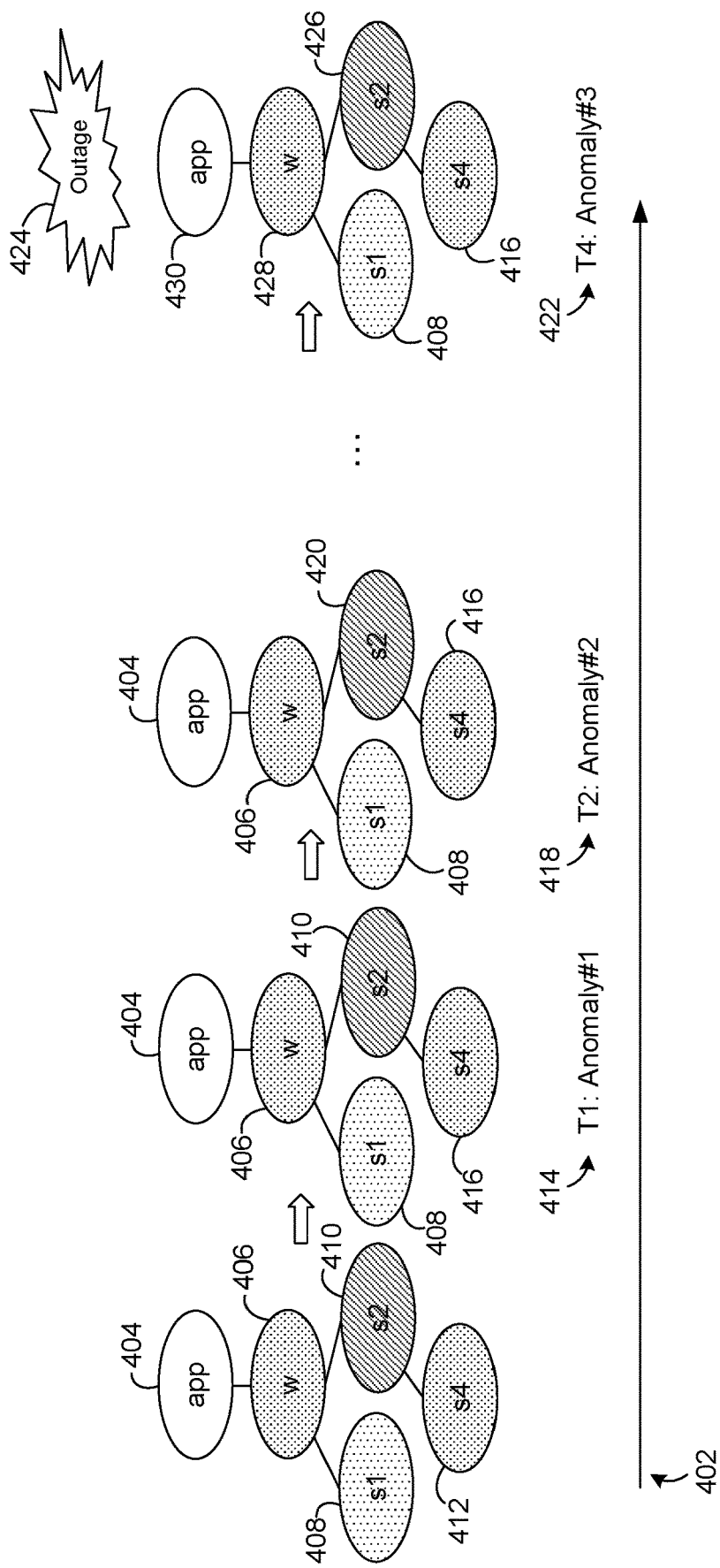
FIG. 4 illustrates example causal graphs corresponding to service models, which demonstrate the types of temporal patterns of FIG. 3.

FIG. 4 illustrates example causal graphs corresponding to service models, which demonstrate the types of temporal patterns of FIG. 3. In FIG. 4, a timeline 402 illustrates a progression of a causal graph 400 corresponding to a service model, in which a service or other application 404 is provided by a component 406 (e.g., a web server), a component 408 (e.g., a first server), a component 410 (e.g., a second server), and a component 412 (e.g., a third server). In the simplified example of FIG. 4, the component 412 directly supports, provides, or otherwise impacts the component 410, but not the component 408, while the components 408, 410 both directly support, provide, or otherwise impact the component 406, which itself directly supports or provides the application 404.

Further in FIG. 4, at a time T1, a first anomaly 414 occurs, which corresponds to a detected change in the state of the component 412, shown as component 416. For example, a state score of the component 416 may drop below one or more of a plurality of thresholds. For example, for a normalized state score range of 0-100, thresholds may be set at 33 and 66, so that scores at or above 66 are considered 'red,' or sub-optimally functional (or non-function), scores between 33 and 66 may be considered 'yellow,' or slightly anomalous, and scores at 33 or below may be considered 'green,' or normally functioning. Of course, other thresholds and categorization schemes may be used.

In FIG. 4, the first anomaly 414 may cause the component 412 to turn 'red' (illustrated as component 416 at time T1), while a second anomaly 418 at a second time T2 may cause the component 410 to turn 'yellow' (illustrated as component 420 at time T2). At time T4 a third anomaly may occur, causing the 'yellow' component 420 to turn 'red' (illustrated as component 426 at time T4), the component 406 to turn 'red' (illustrated as component 428 at time T4), and the application 404 to turn 'red' (illustrated as application 430 at time T4). A corresponding outage 424 then occurs.

In FIG. 4, as in FIG. 3, the timeline 402 illustrates a temporal pattern that occurs between states of causally connected components. As a historical pattern, the various events on the resulting timeline 402 may be considered to be labelled with corresponding state information, to provide labelled training data 126 of FIG. 1. In currently received performance metrics, component state patterns that develop similarly to the temporal patterns of FIG. 4 may thus be recognized as being predictive of a future outage.

Figure 5:
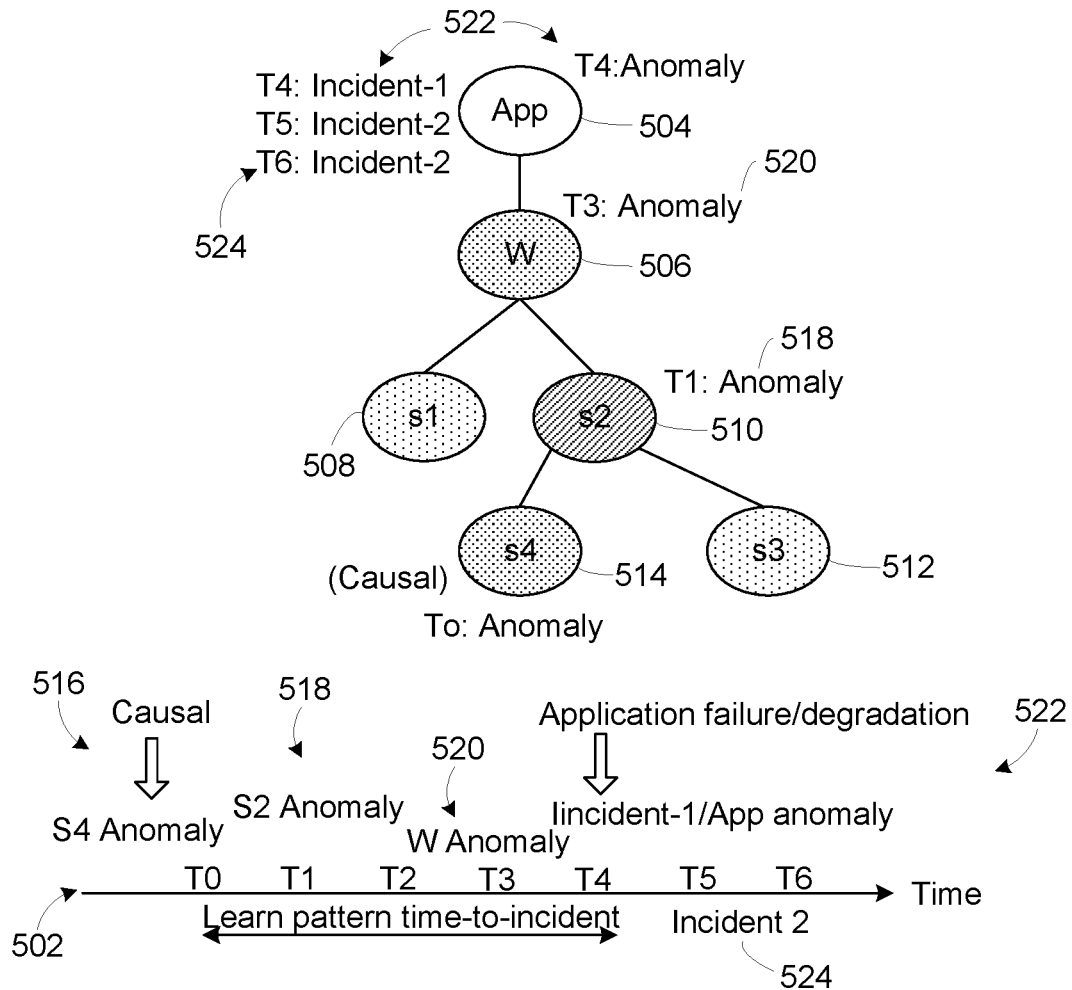
FIG. 5 illustrates additional examples of a timeline of temporal patterns and a corresponding causal graph.

FIG. 5 illustrates additional examples of a timeline 502 of temporal patterns and a corresponding causal graph 500. As shown, and similar to FIG. 4, an application 504 is supported by a component 506, which is supported or provided by a component 508 and a component 510. The component 510 is supported or provided by a component 512 and a component 514.

Further in FIG. 5, a causal anomaly 516 at time T0 causes the component 514 to enter a 'red' state. An anomaly 518 at time T1 causes the component 510 to enter a 'yellow' state. An anomaly 520 at time T3 causes the component 506 to enter a 'red' state. At time T4, a degradation/failure/outage 522 is associated with a reported incident and an application anomaly, which then leads to a second reported incident 524 at times T5, T6.

FIG. 5 illustrates a timeline before the point of failure of an application at T4 may be used to work backward N timesteps until a root cause anomaly is reached, in order to define a pattern of anomalies. As described, these patterns about a sequence of states and anomalies to a failure state may be used to build predictive supervised models for application state prediction in the future (T4), from a sequence of patterns at times T0, T1, T2 and T3, as the state of the graph evolves. The supervised models can include classifiers, long short term model (LSTM) neural nets, graph neural nets, or other suitable techniques. Once a model is learned, then any time a pattern of anomaly at s4 followed by an anomaly at each of s4 and s2 is seen, then an incident (application degradation, failure, and outage) may be predicted to happen in the future.

Thus, as in FIGS. 3 and 4, the simplified example of FIG. 5 illustrates that the system of FIG. 1 may learn a time-to-incident pattern 526 for the application 504. At a future time, using then-current performance metrics and associated component states, a resulting, trained state prediction model 128 may predict incidents corresponding to the incidents 522, 524, including a predicted number of timestamps in the future at which such incidents are predicted to occur.

Figure 10:
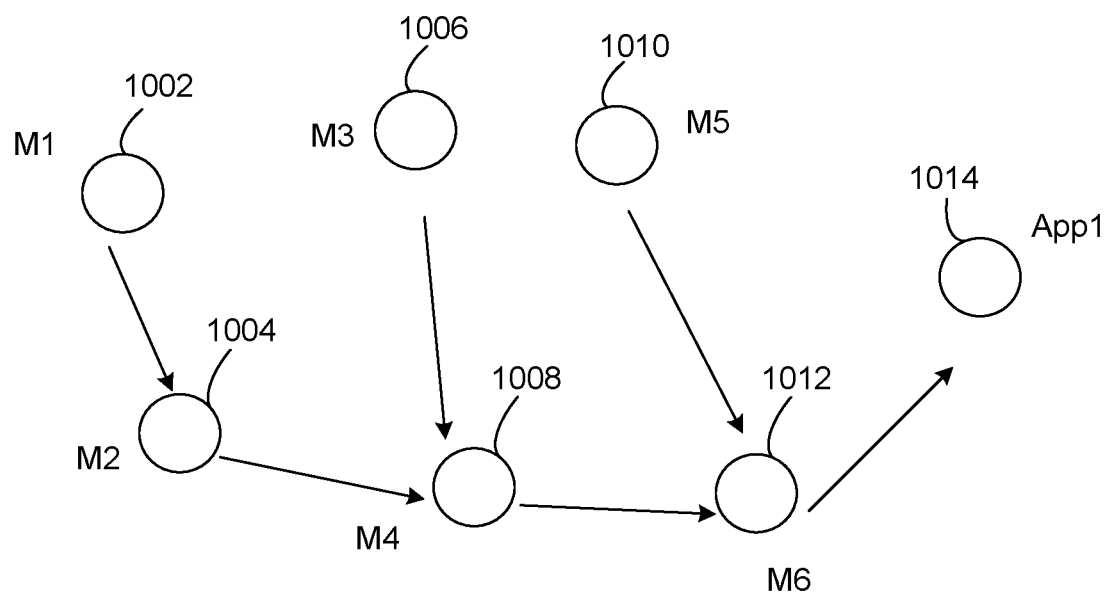
FIG. 10 is an example graph illustrating cause relationships between components corresponding to a service model.
Figure 11:
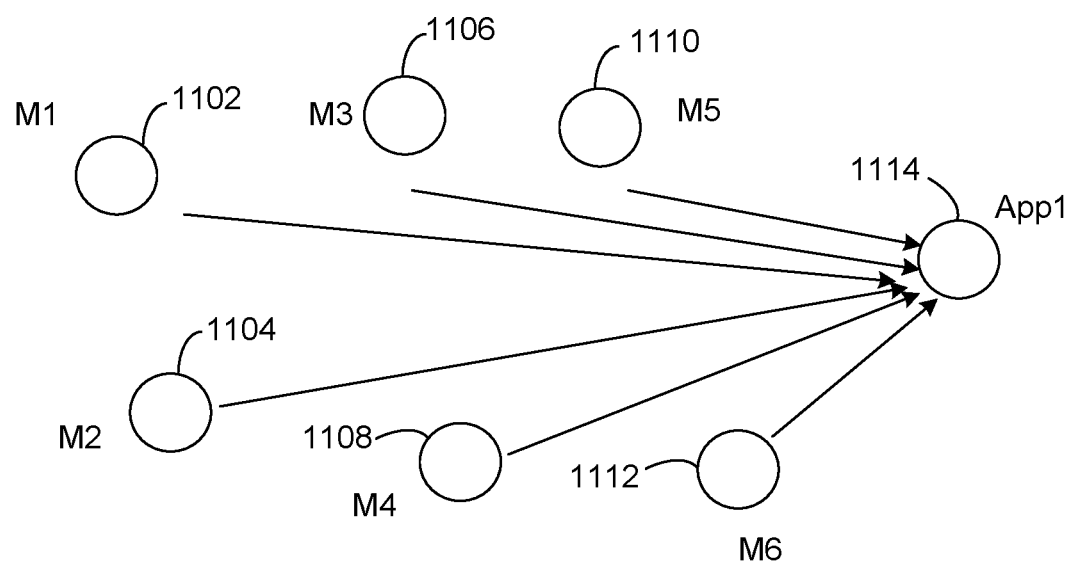
FIG. 11 illustrates a second example graph corresponding to an application.

FIGS. 4 and 5 illustrate that a topology graph for a service model may be used to model or otherwise determine a corresponding causal graph (e.g., a Bayesian Network, as also illustrated in FIG. 10). The causal graph may then permit building a state-predictive LSTM neural net model, or other suitable, trained supervised machine learning model, for each node of such a causal graph. When a topology service model is not available, a flat graph may be used, such as shown in FIG. 11.

Figure 6:
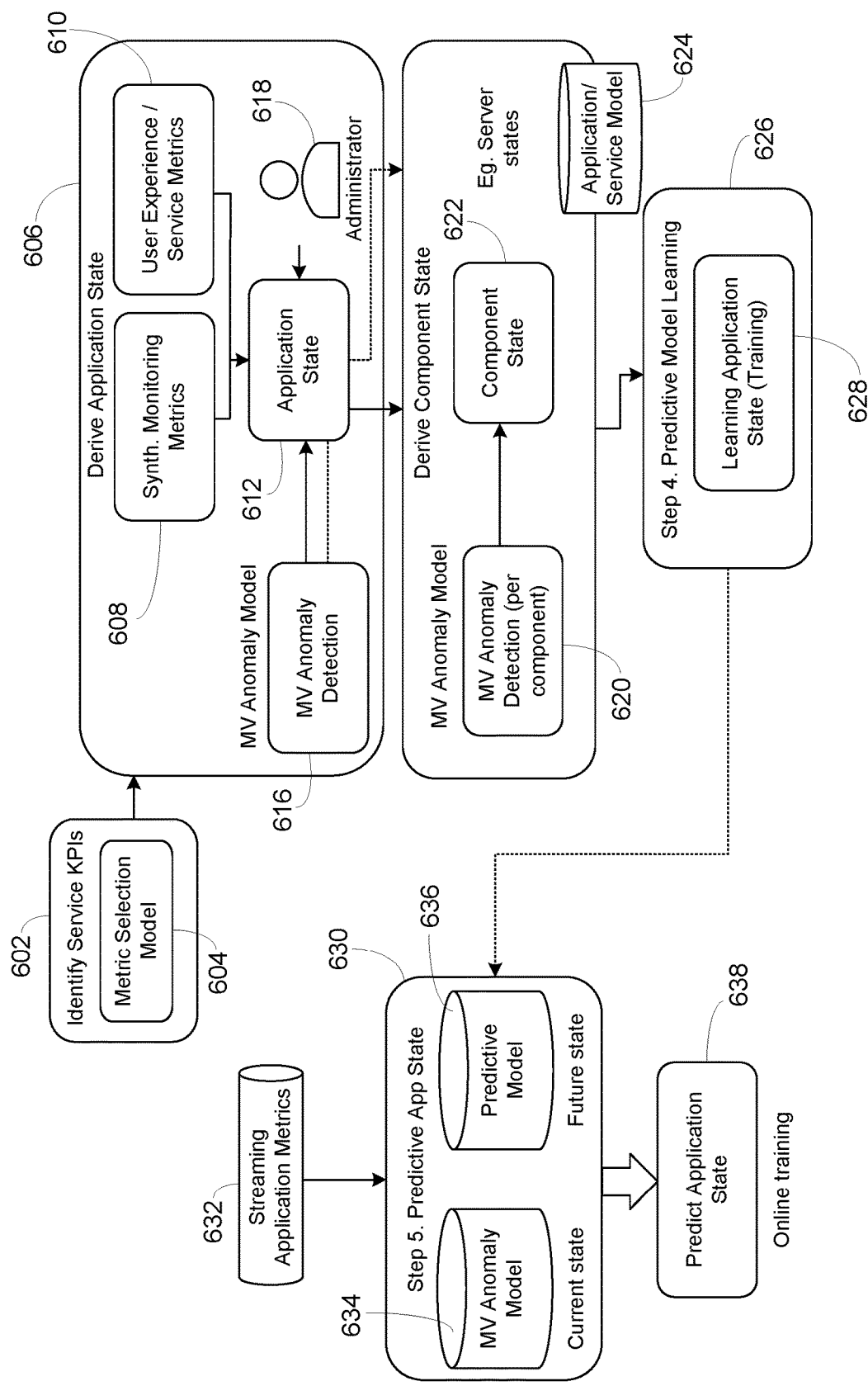
FIG. 6 is a block diagram of a more detailed example implementation of the system of FIG. 1.

FIG. 6 is a block diagram of a more detailed example implementation of the system of FIG. 1. In FIG. 6, desired service KPIs are selected (602). As described, metric selection model 604, which may utilize PCA, may be conducted to determine and select a most-useful subset of KPIs from among what may be hundreds, thousands, or tens of thousands of available KPIs.

Thus, to recommend KPIs, the features (metrics) of the data may be determined mathematically, that explain existing variance in the data, and/or which exhibit more data spread. PCA identifies and accounts for, e.g., 90-95% of data variance in the historical data, and thus provides a suitable basis for selecting the subset of KPIs for service level indicator (SLI). However, other techniques may be used. For example, machine learning may be used over time to train a model to select a suitable subset of KPIs, e.g., using a PCA-based model.

Then, an application state may be derived (606). Example factors and techniques for deriving an application state are described in more detail, below, with respect to FIG. 7. In general, in FIG. 6, synthetic monitoring metrics 608, and user experience (service metrics) 610 may be used together with the selected service KPIs to train and implement a multi-variate (MV) anomaly detection model 616.

That is, the MV anomaly detection model 616 provides an example of the anomaly detection models 116 of FIG. 1. Such multi-variate anomaly detection may be more accurate and more useful than existing, uni-variate anomaly detection, while being more computationally efficient than uni-variate anomaly detection, as well (e.g., having fewer false positive anomaly alerts).

A resulting application state 612 may be determined. As described, the application state may be scaled and normalized to a uniform range that applies to all application and components, in conjunction with setting corresponding thresholds defining or categorizing specific states, or types of states. An administrator 618 may have the option of manually adjusting or otherwise tuning the application state 612.

Component states may also be determined 622. As described below with respect to FIG. 8, multiple factors or variables may be used to construct a MV anomaly detection model 620 for each component, and thereby determine a component state 622 of each component.

Figure 7:
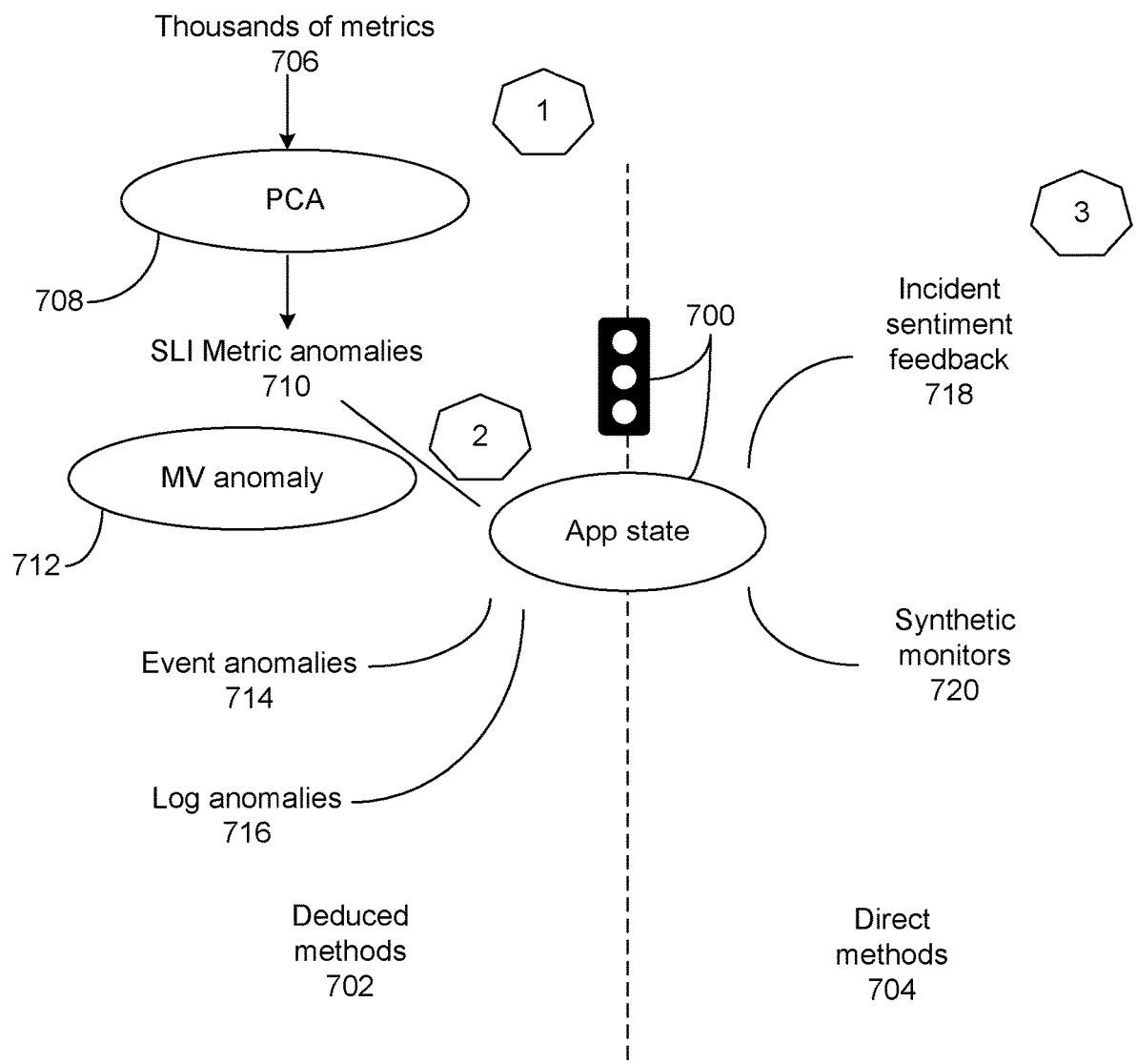
FIG. 7 is a block diagram illustrating an example of application state determination.
Figure 8:
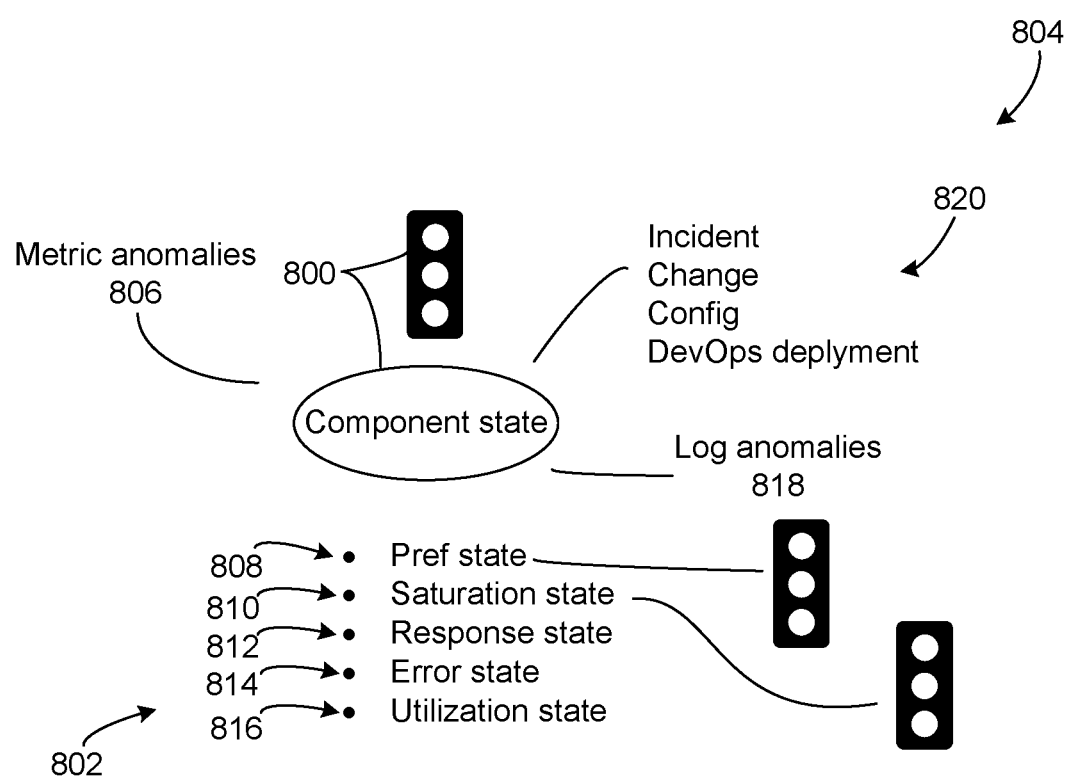
FIG. 8 is a block diagram illustrating an example of component state determination.

As may be seen from FIGS. 7 and 8, many factors or variables may overlap or coincide when determining application and component states. For example, the same overlapping or similar KPIs may be used for an application and for one or more underlying components. Mathematical techniques for determining the application states and component states may be the same or similar, as also described with respect to the examples of FIGS. 7 and 8, below.

Predictive model learning may then proceed (626), to conduct learning application states (training) processes 628 for constructing and training an application state prediction model 624. As described above, the application states and component states may be correlated with timestamps of the various types of performance data being used, and thereby may effectively provide labelled training data.

Once training is completed, models 634, and predictive model 636 may be deployed and currently received streaming application metrics 632 may be processed to perform application state determinations (630). As shown, a MV anomaly model 634 may provide current states of applications and related components, which provides useful current information regarding the applications and components. The predictive model 636 may also predict future application states 638, including, both positive and negative, e.g., performance degradations, latencies, outages, and other incidents, including specific timestamps at which such predictions are predicted to occur. For example, the predictive model 636 may be fed a defined number of preceding timestamps and associated data (e.g., a most-recent 24 timestamps), to thereby output corresponding application state predictions.

FIG. 7 is a diagram illustrating an example of application state determination. FIG. 7 illustrates that determination of application state 700 may include both deduced methods 702 and direct methods 704.

Deduced methods 702 refer to inference of the application state 700 from, e.g., available data characterizing system(s) and device(s)' performance. For example, as already described, thousands of metrics 706 may be reduced by PCA 708 and used by an MV anomaly model 712 to determine service level indicator (SLI) metric anomalies.

Additionally, event anomalies 714 may include historical events, such as previously-occurring performance degradations, latencies, or other anomaly-related events. Similarly, log anomalies 716 may be determined from system logs or log files.

Direct methods 704 may include service management metrics, e.g., including reports of user interactions 718, including feedback, incident reports, sentiment reports, and user ratings. Such data may be standardized and normalized for inclusion in determining the application state 700.

Synthetic monitors 720 may be used to provide simulations of system performance. Obtained synthetic data, although simulated, may deal with most-common or most-likely types of anomalies that may occur, and may also be useful in determining the application state 700.

FIG. 8 is a diagram illustrating an example of component state determination. In some implementations, it is possible to determine a component state 800 using the same or similar techniques used to determine the application state 700 of FIG. 7, including deduced methods 802 and direct methods 804.

For example, metric anomalies 806 relevant to the particular component may be used from the PCA-reduced set of metrics. Some components may have state-based anomalies that are more specific to individual components or types of components. For example, in FIG. 8, the component state may be based on a performance state 808, a saturation state 810, a response state 812, an error state 814, and a utilization state 816. Log anomalies 818 may also be used.

Similarly to the deduced methods 802, the direct methods 804 may overlap with similar direct methods 704 of FIG. 7 for the application state, but may include additional or alternative data that is particular to the component, or type of component, and that relates to users of the component(s), such as incident managers, support personnel, developers, or administrators. For example, in additional to incident reports 820, change reports 822, configuration data 824, and development operations (also referred to as DevOps, referring to continuous deployment automation) data 826 may be used.

FIG. 9 is an example chart illustrating calculated component and application states, and related temporal patterns. In FIG. 9, a column 902 includes timestamps corresponding to collected data in columns 904-914.

Specifically, columns 904 include monitoring metrics (e.g., deduced performance data from FIGS. 7 and 8), while columns 906 include service management data metrics (e.g., direct performance data from FIGS. 7 and 8).

Column 908 includes component state data for a component "M1," while column 910 includes component state data for a component "M2" and column 912 includes component state data for a component "M6." Column 914 includes application state data for an application corresponding to the various components M1, M2, M6.

FIG. 9 illustrates that an anomalous state 916 for the component M1 occurs at timestamp t0-1, with a state value of 90. Subsequently, an anomalous state 918 for the application occurs at timestamp t1, with a state value of 74. Then, an anomalous state 920 for the application occurs at timestamp t2, with a state value of 92.

Thus, FIG. 9 gives a quantified view similar to the examples of FIGS. 3-5, in which anomalous states of components and/or application(s) illustrate a temporal pattern that may be learned and used to predict similar, future application states FIG. 10 illustrates an example causal graph corresponding to a service model. In FIG. 10, a component M1 1002 is causally connected to a component M2 1004, which is causally connected to a component M4 1008.

A component M3 1006 is also causally connected to the component M4 1008. The component M4 1008 is causally connected to a component M6 1012. A component M5 1010 is also causally connected to the component M6 1012. The component M6 1012 is causally connected to an application App1 1014. In FIG. 10, a state predictive LSTM neural net model may be constructed for each of the nodes 1002-1014, including all components M1-M6 and the application, App1. Then, states may be updated in real time at each node and passed to subsequent LSTM neural net models of subsequent, connected nodes, to ultimately predict the future state of the application 1014.

In contrast, FIG. 11 illustrates an example flat graph corresponding to an application App 1. Such a flat graph may be a default graph for representing components' relationships to an application, since a hierarchical service model for an application (such as in FIG. 10) may not always be available. The example of FIG. 11 may require additional processing, since processing of the illustrated flat graph considers possible causal connections for each illustrated component, whereas the example of FIG. 10 only requires processing of causal connections between each directly-connected pair of components, or between the application and any directly-connected component.

In FIG. 11, component M1 1102, component M2 1104, component M3 1106, component M4 1108, component M5 1110, and component M6 1112 are all directly and causally connected to an application App1 1114. As shown, and as just referenced above, in such an approach, all components 1102-1112 directly impact the application 1114, so that a single LSTM model may be used for the application 1114. That is, only one LSTM model is needed at the application node (root). Once the anomaly detection models for the component states and application states are trained, then as new anomalies are detected, the states are updated for all components (nodes) 1102-1112 in the graph, and then this data is passed to the LSTM model for the application 1114 to predict the future state of the application 1114.

As shown in FIG. 7, a state of an application may be a function of selected KPIs metrics (m) as well as service management metrics (e) that monitor by observing normal vs. abnormal behaviors. The application state can be simply be defined in terms of a state score (0-100), which depicts the deviation of system state from the normal. If the system state is normal, state score will be low, if the state is abnormal, the score will be high.

This score calculation may be based on a scoring function from one of the anomaly detection algorithms (such as the Random Cut Forest algorithm), although any unsupervised algorithm can be used such as a K-means clustering algorithm (in which case the scoring formulae will be different and related to the distance from the centroid at the center of the cluster). The unsupervised techniques on multi-variate representation of KPI metrics (m) data together with service management metrics (e) data can provide an adequate representation of the state of the application.

Given time series data, for every time stamp ($t_i$), a vector representing different metrics' values may be provided, i.e., At $t_i$:$(m_{t_i1}, m_{t_i2}, m_{t_i3}, \ldots, e_{t_i1}, e_{t_i2}, e_{t_i3}, \ldots)$ At $t_{i+1}$:$(m_{t_{i+1}1}, m_{t_{i+1}2}, m_{t_{i+1}3}, \ldots, e_{t_{i+1}1}, e_{t_{i+1}2}, e_{t_{i+1}3}, \ldots)$

. . .

Vector points ($X_1$) and Robust Random Cut Forest (RRCF) may provide anomaly detection on streaming data by constructing tree graphs, which together are called a forest. RRCF, on the basis of constructed tree graphs, assigns a Collusive-Displacement (Co-Disp) score to every point in the forest. Co-Disp calculates the change in model complexity incurred by inserting or deleting a given vector point ($X_i$), as shown:

$$CoDisp(x, Z, |S|) = \mathbb{E}_{S \subseteq Z, T}\left[\max_{x \in C \subseteq S} \frac{1}{|C|} \sum_{y \in S-C} ((f(y, S, T) - f(y, S-C, T''))\right]$$

Where, x is the point and f(y, S, T) is the function of the depth of the point y on the tree T built on S sub z, Z is the original set without point x, S is a subset on which the tree, T is built, App State(State(app1,$t$))=F1[Collusive-Disp(KPIs metrics),(Service Management metrics)]

Alternatively, when accurate service management metrics (e) are available, they can be used to drive the state of the application using a simple linear weighted equation relating the service management metrics (e) such as:

App State(State(app1,$t$))=alpha1*Incident=True+ alpha2*SyntheticState+alpha3*UserFeedback In some implementations it is possible to combine these equations for a more accurate state of the application.

This application score once normalized (0-100), will depict the actual state of the application $A_{app_1, t}$ $$A_{app_1, t} = \left\|\left(\frac{State_{(app_1, t)} - Min(State_{(app_1, t_i)})}{Max(State_{(app_1, t_i)}) - Min(State_{(app_1, t_i)})}\right)\right\| \times 100$$

Application state may be computed using the above on historic data. This converts initial unsupervised metric data into supervised data in which the application state at each timestep is indicated in the far-right column of the chart of FIG. 9.

With respect to component states, as described with respect to FIG. 8, each component in an application has a set of metrics and events associated with it. For example, a server component can have many CPU, memory, disk, and application metrics associated with it. As described above, FIG. 10 shows 6 components 1002-1012 related to the single application 1014. The state of each component for every time stamp (t) may be determined by using unsupervised techniques, as described above with respect to the application state.

This eventually translates to detecting the overall state of the component at any given time(t). In general, the higher the Co-Disp score, the more anomalous is the state of component at that time. Finally, rescaling the $State_{M1}$ function with min-max scaling, an anomaly score for the component ($A_{server}$) may be determined, as follows:

$$A_{server(M1, t)} = \left\|\left(\frac{State_{(M1, t)} - Min(State_{(M1, t_i)})}{Max(State_{(M1, t_i)}) - Min(State_{(M1, t_i)})}\right)\right\| \times 100$$

An anomaly score of component (M1), $A_{server_{(M}}1, t)$ will be in the range of 0-100. Then Standard Deviation ($\sigma$, 2 $\sigma$, 3 $\sigma$) can be used to bucket this into different classes.

$$\text{Bucket}_{server(M1,t)} = \begin{cases} 1; \text{if } Z_{A_{server(M1,t)}} \leq \sigma \\ 2; \text{if } \sigma < Z_{A_{server(M1,t)}} \leq 2\sigma \\ 3; \text{if } 2\sigma < Z_{A_{server(M1,t)}} \leq 3\sigma \\ 4; \text{if } 3\sigma < Z_{A_{server(M1,t)}} \end{cases}$$

A state of every component may be updated in real time. A state score, i.e., $$A_{server(M_i,t)},$$

, may be determined at time(t) for every component. As shown in FIG. 8, in addition to using metrics, the state of a component is also dependent on events anomalies, log anomalies, and incidents on the component. Just as with the application state, a linear combination of all scores may be used to accurately determine the component state.

As shown in FIG. 9, the higher the score, the more anomalous the state. This state is also represented in specific metrics (not shown) that cause a state change. By using root cause techniques, it is possible to identify additional metadata for the states, such as a causal event that happens the earliest and deepest in a graph in a time series of anomalies. If the causal event cannot be determined, then this information is not treated as input to the model training.

Prediction using Bayesian Networks has the two sub cases shown in FIG. 10 and FIG. 11, i.e., when a service model is available or not available. When available, multiple machine learning (ML) models may be used at each parent node. For example, FIG. 10 illustrates a causal graph that resembles a Directed Acyclic Graph (DAG). A probability distribution for each independent node (which is a component node with no parent) may be calculated as $$\left(P\left(A_{server_{M_i}}\right)\right).$$

. The server state values, for time $t_i$, $t_{i-1}$, $t_{i-2}$, . . . , where i=0 (present time), may be used to calculate the probability distribution.

A pair-wise conditional probability of a component node being in a given state at time t+1 may be calculated. That is, it is possible to predict the state of a component node at time t+1, for all the causal connections where there is a direct connection from nodes $M_j$, $M_k$, . . . to $M_i$. To calculate this pairwise conditional probability of a component node, a recurrent neural network (e.g., LSTM) may be used to predict the probability of the next state using the current state of same node as well as its causal connections, i.e., $$\left(A_{server_{M_i,t+1}} | A_{server_{M_i,t}}, A_{server_{M_j,t}}, A_{server_{M_k,t}}, \ldots \right)$$

In such cases, there will be a ML model for every component node, predicting the probability of a component node (at time t+1) in good, moderate, and bad states, and given the state(s) of causal connection(s) at time t.

Further in FIGS. 10, M2 and M3 both point to M4 so a LSTM model may be built for M4 by using the M2, M3, and M4 states at t=0 to predict a state of M4 at t=1 or later times.

When a service model is not available, it may be assumed that an application node is directly connected to every component node, as shown in FIG. 11. Therefore, component (e.g., Server) nodes 1102-1112 are directly connected to the final service node, App1, the application node 1114. This resembles a 2-node Directed Acyclic Graph (DAG).

In such case, a state of every node may be updated in real time. A state score, i.e., $$A_{server(M_i,t)},$$

, may be determined at time t for every component node. A probability distribution may be calculated for each independent node (component nodes with no parent), $$\left(P\left(A_{server_{M_i}}\right)\right).$$

. Then, component state values, for time $t_i$, $t_{i-1}$, $t_{i-2}$, . . . , where i=0 (present time), may be used to calculate the probability distribution.

A conditional probability of an application node being in a given state at time t+1 may be calculated. In other words, the state of application node at time t+1, may be predicted, using the component node state values. To calculate the conditional probability of an application node, the recurrent neural network (e.g., LSTM) may be used to predict a probability of the next state, using the current state of an application node and prior states for the N periods where N (N=1) is a predefined lag.

$$\left(A_{App(t+1)} | A_{App(t)}, A_{server_{M_i,t}}, A_{server_{M_j,t}}, A_{server_{M_k,t}}, \ldots \right)$$

In such cases, there will be a single ML model for the application, predicting the probability of an app node (at time t+1, or more generally t+N) in good, moderate, or bad states, given the state of the app at time t and state(s) of all the component nodes at time t.

As described, the generated neural net models for application state prediction are designed to understand the temporal pattern of events being learned over time through labelled training data, and as new data is seen in the prediction phase, will predict based on those learned patterns. Once the models are built, live data may be fed to the application state prediction model(s) to start predicting the state of the application in the future.

Models may be constructed using different notation and/or languages. For example, models may be constructed using the Predictive Model Markup Language (PMML), which is an eXtensible Markup Language (XML)-based model interchange format, using Javascript Object Notation (JSON), or other suitable techniques. The models may use any known or future algorithm.

In summary, service KPIs may be automatically recommended as a list of metrics that explain variation in historic data. Application state may be determined based on service management data, as well as unsupervised multi-variate analytics to accurately predict application state. Application state may be a function of (service-KPI-1, service-KPI-2, . . . service-KPI-N, change, config, incident, user experience, synthetic monitoring status, topology-map, sentiment analysis).

Graph-based patterns are used to predict application-level anomalies. Predicting application status incidents is done using neural nets to determine the (future) conditional probability of the state of an application given the state and metric anomalies of individual components at N prior time slots. Patterns of causal events (earliest anomaly) that affect events (Incident/Application issue/anomaly) over a time lag (N) of data are learned and used to predict future outages and degradations in application through these models. Thus, if events that resemble "causal" events are observed, then it is possible to predict application failures and other incidents, with early and precise warning.

As described above and as illustrated in FIGS. 1-11, application state may be predicted by identifying correlated cross-domain patterns in IT monitoring metrics, their anomalies and root causes, with service management metrics including tickets, synthetic metrics, user sentiment, feedback (e.g., Ratings 1 star to 5 stars) and topology service models.

An application's (abnormality) state as well as a component's (abnormality) state may be derived using unsupervised ML algorithms combined with service management metrics. Root cause techniques may be used to determine causal events from these anomalies that usually represent the start of an application's abnormality state. A service model may be modified into a causal graph, and a neural net model trained at each node to predict a future state of a parent node by using the set of child node states in timestep t through t+N−1 to predict the state at t+N (N timesteps in the future).

To determine application state, multi-variate anomaly detection on PCA-reduced metrics for an application may be used and combined with service management data such as tickets, user feedback, and synthetics data to determine the state of the application accurately. Root cause techniques may be used to determine the set of anomalies that are the likely causes for application state degradation, e.g., that happen earliest and deepest in a particular graph. Similarly, for component state, multi-variate anomaly detection may be performed using all metrics for each component (e.g., server) to determine the state of each component.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
receive a data stream of performance metrics characterizing a technology landscape, the technology landscape including at least one application provided by at least one component;
determine component states of the at least one component and application states of the at least one application at corresponding timestamps, using the data stream of performance metrics and at least one anomaly detection model constructed with an unsupervised machine learning algorithm;

apply each component state of the component states, and each application state of the application states, as a label of each corresponding timestamp, to obtain labelled training data;

train a supervised machine learning algorithm using the labelled training data, to obtain at least one state prediction model;

detect a temporal pattern of component states of the at least one component, based on the performance metrics; and predict a future application state of the at least one application, based on the temporal pattern of component states and the at least one state prediction model.

2. The computer program product of claim 1, wherein the instructions, when executed, are further configured to cause the at least one computing device to:

receive the data stream of performance metrics including a set of Known Performance Indicators (KPIs) characterizing the at least one component and the at least one application;

reduce the set of KPIs by applying a Principal Component Analysis (PCA) to the set of KPIs and thereby obtain a reduced set of KPIs; and determine the component states of the at least one component and the application states of the at least one application at corresponding timestamps, based on the reduced set of KPIs.

3. The computer program product of claim 1, wherein the instructions, when executed, are further configured to cause the at least one computing device to:

receive the data stream of performance metrics including reports of user interactions with the at least one application; and determine, based on the reports, a component state of the component states and an application state of the application states at a corresponding timestamp of each report of the reports.

4. The computer program product of claim 1, wherein the instructions, when executed, are further configured to cause the at least one computing device to:

classify the component states and application states with respect to anomaly thresholds, using the at least one anomaly detection model; and generate an alert when the one or more of the component states or the application states crosses one of the anomaly thresholds.

5. The computer program product of claim 1, wherein the at least one application is associated with a service model that describes causal relationships between a plurality of components, including the at least one component, and the at least one application.

6. The computer program product of claim 5, wherein the instructions, when executed, are further configured to cause the at least one computing device to:

predict the future application state of the at least one application, based on the temporal pattern of component states and on the causal relationships.

7. The computer program product of claim 1, wherein the instructions, when executed, are further configured to cause the at least one computing device to:

predict the future application state of the at least one application, including predicting a bounded time window during which the future application state will occur.

8. The computer program product of claim 1, wherein the instructions, when executed, are further configured to cause the at least one computing device to:

detect a temporal pattern of application states of the at least one application, based on the performance metrics; and predict the future application state of the at least one application, based on the temporal pattern of application states.

9. A computer-implemented method, the method comprising:

receiving a data stream of performance metrics characterizing a technology landscape, the technology landscape including at least one application provided by at least one component;

determining component states of the at least one component and application states of the at least one application at corresponding timestamps, using the data stream of performance metrics and at least one anomaly detection model constructed with an unsupervised machine learning algorithm;

applying each component state of the component states, and each application state of the application states, as a label of each corresponding timestamp, to obtain labelled training data;

training a supervised machine learning algorithm using the labelled training data, to obtain at least one state prediction model;

detecting a temporal pattern of component states of the at least one component, based on the performance metrics; and predicting a future application state of the at least one application, based on the temporal pattern of component states and the at least one state prediction model.

10. The method of claim 9, further comprising:

classifying the component states and application states with respect to anomaly thresholds, using the at least one anomaly detection model; and generating an alert when the one or more of the component states or the application states crosses one of the anomaly thresholds.

11. The method of claim 9, wherein the at least one application is associated with a service model that describes causal relationships between a plurality of components, including the at least one component, and the at least one application.

12. The method of claim 11, further comprising:

predicting the future application state of the at least one application, based on the temporal pattern of component states and on the causal relationships.

13. The method of claim 9, further comprising:

predicting the future application state of the at least one application, including predicting a bounded time window during which the future application state will occur.

14. A system comprising:

at least one memory including instructions; and at least one processor that is operably coupled to the at least one memory and that is arranged and configured to execute instructions that, when executed, cause the at least one processor to receive a data stream of performance metrics characterizing a technology landscape, the technology landscape including at least one application provided by at least one component;

determine component states of the at least one component and application states of the at least one application at corresponding timestamps, using the data stream of performance metrics and at least one anomaly detection model constructed with an unsupervised machine learning algorithm;

apply each component state of the component states, and each application state of the application states, as a label of each corresponding timestamp, to obtain labelled training data;

train a supervised machine learning algorithm using the labelled training data, to obtain at least one state prediction model;

detect a temporal pattern of component states of the at least one component, based on the performance metrics; and predict a future application state of the at least one application, based on the temporal pattern of component states and the at least one state prediction model.

* * * * *